United States Patent
Okubo et al.

(10) Patent No.: US 6,540,613 B2
(45) Date of Patent: Apr. 1, 2003

(54) VIDEO GAME APPARATUS, BACKGROUND SOUND OUTPUT SETTING METHOD IN VIDEO GAME, AND COMPUTER-READABLE RECORDING MEDIUM STORING BACKGROUND SOUND OUTPUT SETTING PROGRAM

(75) Inventors: Satoru Okubo, Osaka (JP); Shigeru Araki, Takatsuki (JP)

(73) Assignee: Konami Corporation, Tokyo (JP)

( * ) Notice: Subject to any disclaimer, the term of this patent is extended or adjusted under 35 U.S.C. 154(b) by 0 days.

(21) Appl. No.: 09/804,512

(22) Filed: Mar. 12, 2001

(65) Prior Publication Data

US 2001/0023202 A1 Sep. 20, 2001

(30) Foreign Application Priority Data

Mar. 13, 2000 (JP) .................................. 2000-069272

(51) Int. Cl.$^7$ ................................................ A63F 13/00
(52) U.S. Cl. ......................... 463/35; 381/19; 381/310
(58) Field of Search ......................... 463/30, 32, 35; 381/19, 300, 303, 304, 305, 310

(56) References Cited

U.S. PATENT DOCUMENTS

| 4,375,287 A | | 3/1983 | Smith | |
| 5,026,051 A | * | 6/1991 | Lowe et al. | .................. 463/35 |
| 5,052,685 A | * | 10/1991 | Lowe et al. | .................. 381/17 |
| 5,138,660 A | | 8/1992 | Lowe et al. | |
| 5,390,938 A | | 2/1995 | Takeya | |
| 5,393,073 A | | 2/1995 | Best | |
| 5,581,618 A | | 12/1996 | Satoshi et al. | |
| 5,604,810 A | | 2/1997 | Yanagawa | |
| 5,633,985 A | | 5/1997 | Severson et al. | |
| 5,633,993 A | | 5/1997 | Redmann et al. | |
| 5,754,660 A | * | 5/1998 | Shimizu | ..................... 381/17 |
| 5,768,393 A | * | 6/1998 | Mukojima et al. | ............ 381/17 |
| 5,862,229 A | * | 1/1999 | Shimizu | ................... 345/419 |
| 5,977,471 A | | 11/1999 | Rosenzweig | |
| 5,993,318 A | * | 11/1999 | Kousaki | ..................... 434/69 |
| 6,111,959 A | | 8/2000 | Taylor | |
| 6,330,486 B1 | * | 12/2001 | Padula | ....................... 381/306 |

FOREIGN PATENT DOCUMENTS

| EP | 07-25354 | 1/1995 |
| EP | 0 943 362 | 9/1999 |
| JP | 07-178244 | 7/1995 |
| JP | 08-149600 | 6/1996 |
| JP | 10-211358 | 8/1998 |
| WO | 94/17515 | 8/1994 |

* cited by examiner

Primary Examiner—Valencia Martin-Wallace
Assistant Examiner—Aaron L. Enatsky
(74) Attorney, Agent, or Firm—Jordan and Hamburg LLP (57) ABSTRACT

A video game apparatus in which a specified event is executed in a game space displayed on a monitor, and a plurality of background sounds having different attributes are outputted at a specified output ratio from a plurality of sound output units spaced apart from each other, comprising: a recording unit for storing the plurality of background sounds as background sound data, and a background sound control unit for setting the output ratio of the background sounds having different attributes to be output from the sound output units according to a viewing point and a viewing direction in the game space while reading the background sound data from the recording unit and outputting them from the plurality of sound output units.

16 Claims, 7 Drawing Sheets

VIDEO GAME APPARATUS, BACKGROUND SOUND OUTPUT SETTING METHOD IN VIDEO GAME, AND COMPUTER-READABLE RECORDING MEDIUM STORING BACKGROUND SOUND OUTPUT SETTING PROGRAM

The present invention relates to a video game apparatus using an optical disk, a magnetic disk or, for example, a cassette-type recording medium including a semiconductor memory or the like in which program data are stored, a background sound output setting method in a video game and a computer readable recording medium storing a background sound output setting program.

BACKGROUND OF THE INVENTION AND RELATED ART STATEMENT

A large number of video game systems have been proposed. These systems include, for example, systems comprised of a special device for home use and a television monitor and systems comprised of a special device for business use, a personal computer or a workstation, a display and a sound output device. Any one of these systems includes a controller used by a game player for operation, a recording medium storing game program data, a CPU for executing controls to generate images and sounds based on the game program data, a processor for generating images, a processor for generating sounds, a CRT or like monitor for displaying images, and a loudspeaker for outputting sounds. CD-ROMs, semiconductor memories, cassette-type recording mediums having a built-in semiconductor memory are frequently used as the above recording medium.

In such video game systems, various competition games such as soccer and baseball games and various running races such as short-distance races and long-distance races which are played outdoors, and gymnastic competitions such as the vaulting horse and the horizontal bar and various other competitions made indoors can be executed in the game space. In event places such as stadiums and gymnasiums where competitions are actually made, various sound components such as "cheers", "noises", "applause" and "vigorous sounds" from the spectators are present. Thus, a game full of feeling of being present at the competition can be realized by outputting various background sounds corresponding to the various sound components at the actual event place as the game progresses in the video game system.

In the actual event place such as the stadium and the track and field stadium, athletes, players, spectators and the like are sometimes photographed while changing a viewing point and a viewing direction of a camera. Thus, a game full of feeling of being present at the competition can be realized by displaying game screens in which the viewing point and the viewing direction are changed in the video game system. In such a case, if the viewing point and the viewing direction are changed, the positions of the sound sources change, thereby changing how the various sound components from the spectators are heard. Therefore, the game may lack a feeling of presence unless the output of the background sounds is changed such that they are similarly heard as at the actual event place when the viewing point and the viewing direction are changed in the video game system.

SUMMARY OF THE INVENTION

In view of the above situation, an object of the present invention is to provide a video game apparatus which can execute a game full of feeling of presence even if a viewing point and a viewing direction are changed, a background sound output setting method in a video game and a computer readable recording medium storing a background sound output setting program.

In order to fulfill the above object according to the present invention, a video game apparatus in which a specified event is executed in a game space displayed on a monitor, and a plurality of background sounds having different attributes are outputted at a specified output ratio from a plurality of sound output units spaced apart from each other, comprising:

a recording unit for storing the plurality of background sounds as background sound data, and a background sound control unit for setting the output ratio of the background sounds having different attributes to be output from the sound output units according to a viewing point and a viewing direction in the game space while reading the background sound data from the recording unit and outputting them from the plurality of sound output units.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
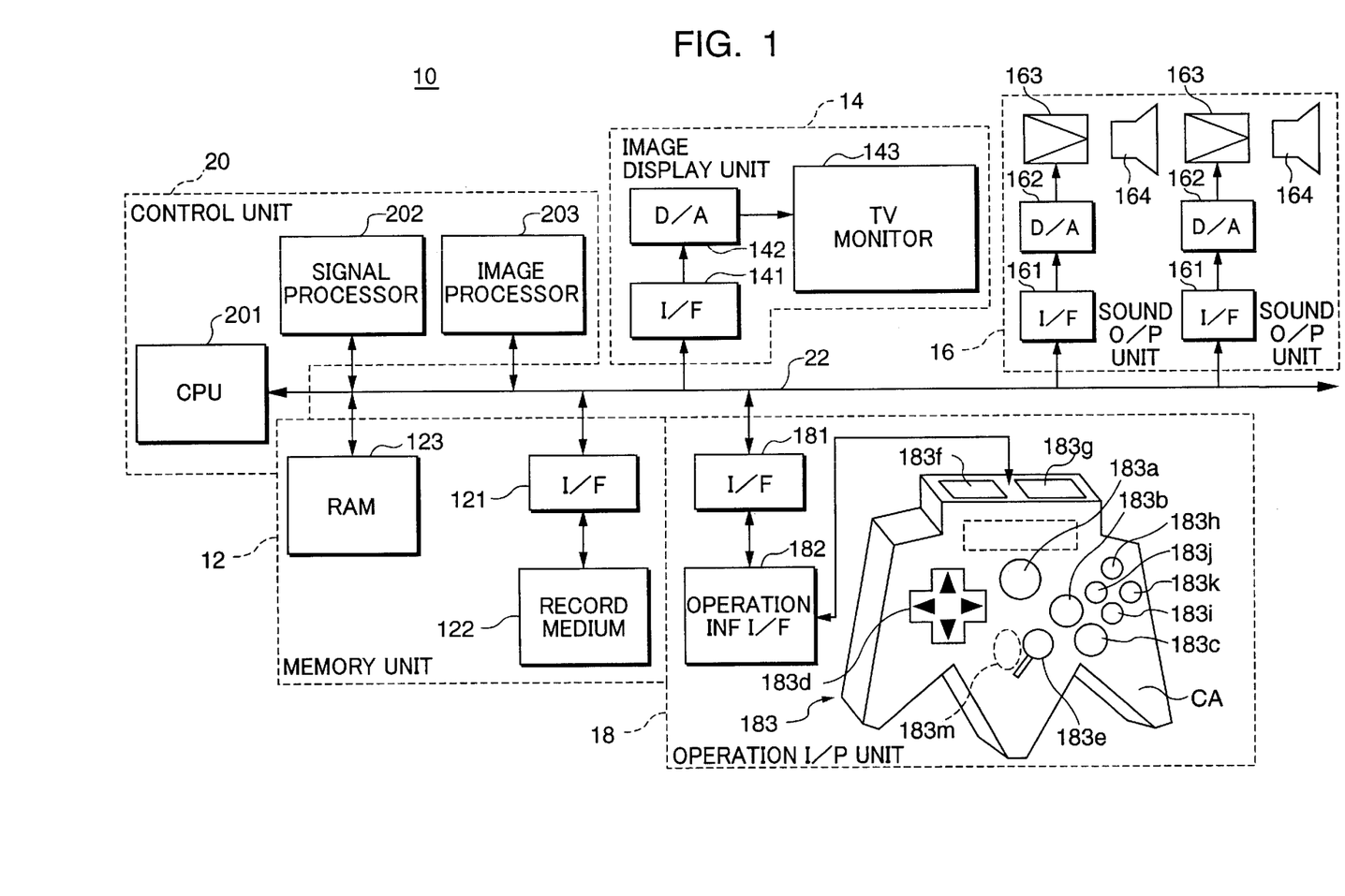
FIG. 1 is a construction diagram showing a video game system to which a background sound output setting method according to one embodiment of the invention is applied.

FIG. 1 is a diagram showing the schematic construction of a video game system (video game apparatus) 10 to which a background sound output setting method according to one embodiment of the present invention is applied. In FIG. 1, the video game system 10 is provided with a memory unit 12, an image display unit 14, a sound output unit 16, an operation input unit 18 and a control unit 20. The units 12, 14, 16 and 18 are connected with each other via a bus 22 including address buses, data buses and control buses connected with a CPU 201 of the control unit 20 to be described later.

In the memory unit 12 are stored game data comprised of image data, sound data and program data. The memory unit 12 includes a recording medium 122 connected with the bus 22 via an interface circuit 121 and a RAM 123 for temporarily storing the game data read from the recording medium 122. The recording medium 122 is, for example, a so-called ROM cassette in which a ROM or like recording medium storing game data and program data of an operating system is accommodated in a plastic casing, an optical disk, or a flexible disk.

The image display unit 14 is adapted to display various game images in accordance with the progress of the game and includes a digital-to-analog (D/A) converter 142 connected with the bus 22 via an interface circuit 141 and a television monitor (video monitor) 143 including a CRT, a liquid crystal display or the like connected with the D/A converter 142.

If there is supposed to be a virtual camera for photographing a play character MA, spectators, etc., a game screen corresponding to a viewing point and a viewing direction of this virtual camera are displayed on the television monitor 143. Specifically, the game screen is displayed by reading an image data corresponding to the viewing point and viewing cycle of, e.g. 1/60 sec. and converting the image data into an analog signal after a specified image processing is applied thereto.

The sound output unit 16 outputs a game music, sound effects and various background sounds such as cheers, announcing sounds and the like for putting enthusiasm into the game content based on the sound data stored in the recording medium 122 or data storage areas of the RAM 123 of the memory unit 12 as the game proceeds. The sound output unit 16 is provided with two D/A converters 162 connected with the bus 22 via interface circuits 161, two amplifying circuits 163 connected with the D/A converters 162 and two loudspeakers 164 as sound output unit for outputting the background sounds in accordance with output signals of the respective amplifying circuits 163. These two loudspeakers 164 output the background sounds via mutually independent signal paths and are provided at the left and right sides of the television monitor 143 while being spaced apart.

The operation input unit 18 is adapted to output operation signals to the control unit 20 and is provided with an operational information interface circuit 182 connected with a bus 22 via an interface circuit 181, and a controller 183 connected with the operational information interface circuit 182. The controller 183 includes a start button 183a, an A-button 183b, a B-button 183c, a cross-shaped key 183d, a stick-shaped controller 183e, a C1-button 183h, a C2-button 183i, a C3-button 183j and a C4-button 183k provided on the front surface of a casing CA, a left trigger button 183f and a right trigger button 183g provided on the upper surface of the casing CA, and a Z-button 183m provided on the rear surface of the casing CA.

The stick-shaped controller 183e has substantially the same construction as a joystick. Specifically, the controller 183e has a standing stick (operation bar), which can be inclined to front, back, left, right or in any direction in a 360° range about a specified point of the stick as a supporting point. According to the direction and angle of inclination of the stick, an X-coordinate along transverse direction and a Y-direction along forward/backward direction in coordinate systems having the standing position of the stick as an origin are sent to the control unit 20 via the interface circuits 182 and 182.

The control unit 20 is adapted to control the progress of the game, and is comprised of the CPU 201 connected with the bus 22, a signal processor 202 and an image processor 203. The signal processor 202 mainly performs calculation of image data corresponding the respective viewing points and viewing directions in a three-dimensional (3D) space, calculation for transforming a position in the 3D space to a position in a simulated 3D space, a light source calculation, and generation and processing of sound data. The image processor 203 writes image data corresponding to the respective viewing points and viewing directions and to be displayed in the RAM 123 based on the calculation results in the signal processor 202. For example, the image processor 202 writes a texture data in an area of the RAM 123 specified by a polygon.

The video game system 10 thus constructed takes different modes according to its application. Specifically, in the case that the video game system 10 is constructed for business use, all the elements shown in FIG. 1 are, for example, contained in one casing. In the case that the video game system 10 is constructed for home use, the television monitor 143, the amplifying circuits 163 and the loudspeakers 164 are separate from a main game unit.

Here, the main game unit is, for example, comprised of the interface circuit 121 connected with the CPU 201, the RAM 123, the interface circuit 141, the D/A converter 142, the interface circuits 161, the D/A converters 162, the interface circuit 181, the operational information interface circuit 182, the controller 183, the signal processor 202 and the image processor 203. This main game unit is constructed by accommodating the respective elements in a casing made of a synthetic resin, and the recording medium 122 is detachably mounted in a mounting portion formed in this casing. The controller 183 is connected with a connector provided in the casing via a communication cable or the like.

In the case that the video game system 10 is constructed with a personal computer or a workstation as a core, for example, the television monitor 143 corresponds to a computer display, the image processor 203 corresponds to part of the game program data stored in the recording medium 122 or hardware on an extension board mounted on an extension slot of the computer, and the interface circuits 121, 141, 161, 181, the D/A converters 142, 162, and the operational information interface circuit 182 correspond to hardware on the extension board mounted on the extension slot of the computer. Further, the RAM 123 corresponds to the main memory of the computer or the respective areas of an extension memory.

A case where the video game system 10 is constructed for home use is described below.

Next, the operation of the video game system 10 is summarily described. First, when an unillustrated power switch is turned on to activate the video game system 10, the CPU 201 reads image data, sound data and game program data from the recording medium 122 in accordance with the operating system stored in the recording medium 122, and all or part of the read image data, sound data and game program data are stored in the RAM 123. Thereafter, a specified game is proceeded by the CPU 201 in accordance with the game program data stored in the RAM 123 and contents of instructions given by a game player via the controller 183.

Specifically, commands as tasks for forming images and outputting sounds are suitably generated in accordance with contents of instructions given by the game player via the controller 183. The signal processor 202 performs calculation of display positions of characters in the 3D space (of course the same applies for a two-dimensional space), a light source calculation, generation and processing of sound data, etc. in accordance with these commands.

Data of images to be formed are written in the RAM 123 by the image processor 203 based on the calculation results. The image data written in the RAM 123 are fed to the D/A converter 142 via the interface circuit 141, and fed to the television monitor 143 after being converted into analog video signals in the D/A converter 142, thereby being displayed as game images on a display surface of the television monitor 143.

On the other hand, the sound data outputted from the signal processor 202 are fed via the interface circuits 161 to the D/A converters 162 and outputted as sounds from the two loudspeakers 164 in a specified volume after being converted into an analog sound signal in the D/A converters 162 and amplified in the amplifying circuits 163. These sounds include various background sounds such as "cheers", "noises", "applause" and "vigorous sounds" having different attributes (sound characters or kinds) for putting enthusiasm into the game contact.

Next, contents of the game executed in the video game system 10 are summarily described based on the game program stored in the recording medium 122. In this video game system 10, a plurality of competition game programs are stored in the recording medium 122, and one competition game can be selected therefrom by operating the start button 183a. For example, a long jump game as shown in FIGS. 2 and 3 can be executed here.

Figure 2:
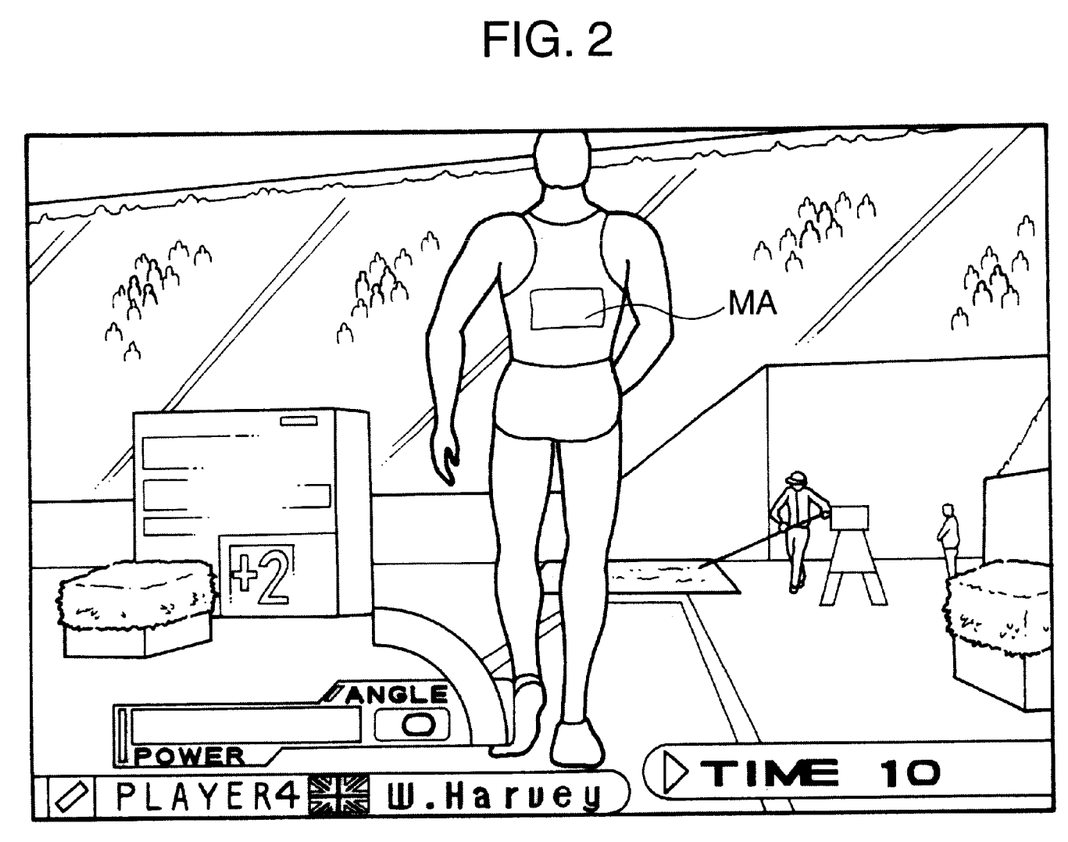
FIG. 2 is a diagram showing one scene of a game executed in the video game system shown in FIG. 1.
Figure 3:
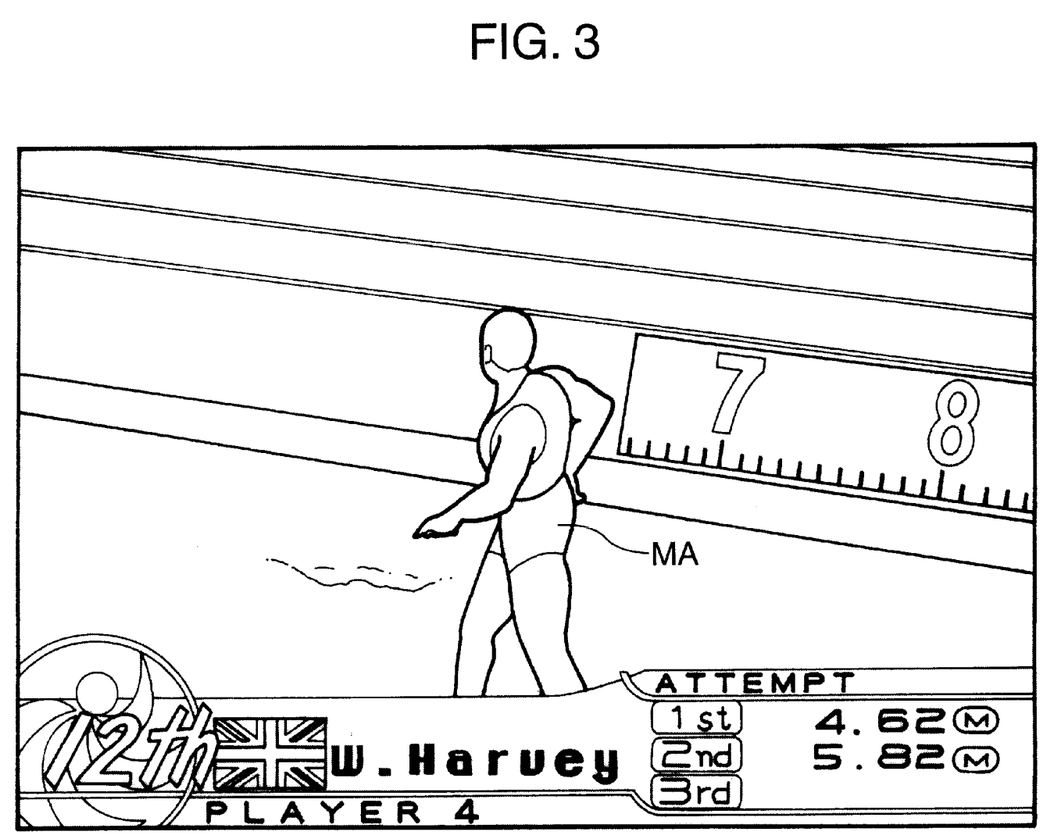
FIG. 3 is a diagram showing a game screen obtained by viewing the scene of the game shown in FIG. 2 at a different point and in a different viewing direction.

The long jump game shown in FIGS. 2 and 3 is held at an indoor track and field stadium (event place) in the game space, and jumped distances are contended by kicking the ground to jump at a specified position after an access run. In this embodiment, the game is played by one to four game players, and play characters MA corresponding to the number of the game players successively appear. Each play character MA jumps three times, and ranking is determined by longest jumped distances of the three jumps.

FIG. 2 shows the play character MA at an access run start position immediately before the start of an access run when viewed from behind. In this case, the viewing point is located behind the play character MA, and the viewing direction is toward the back of the play character MA. FIG. 3 shows the play character MA returning to the access run start position for the third jump after the second jump when viewed from left. In this case, the viewing point is at the left side of the play character MA which is turned to the right about by 90° from the viewing point of FIG. 2, and the viewing direction is toward the left side of the play character MA.

In this way, the viewing point and the viewing direction of the virtual camera are changed based on the game program data or operation of the controller 183 by the game player, and a game screen including the play character MA and the like corresponding to the changed viewing point and viewing direction is displayed on the television monitor 143.

Figure 4:
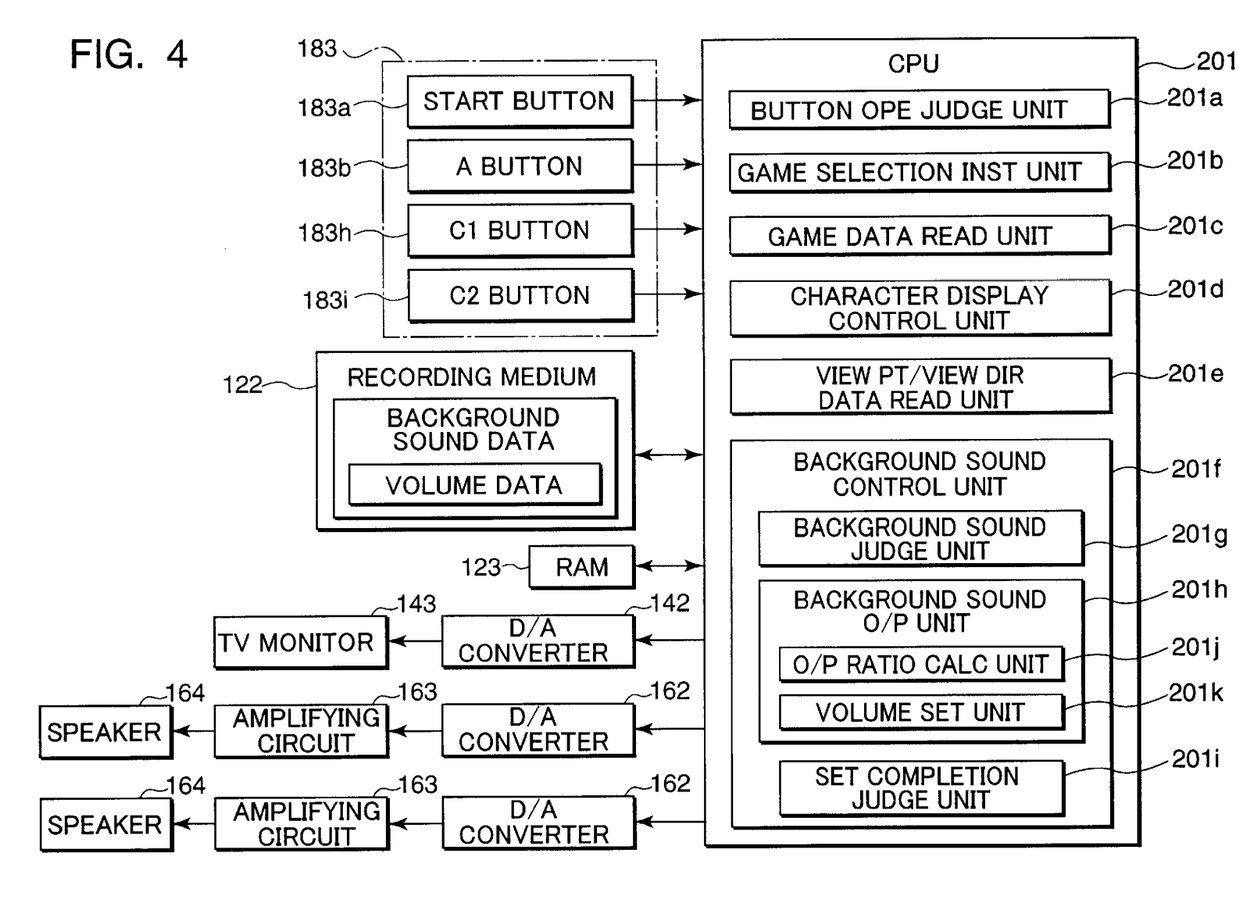
FIG. 4 is a block diagram showing function realizing unit of a CPU in the video game system shown in FIG. 1, FIGS. 5, 6, and 7 are charts showing a method for changing an output ratio of a background sound in the video game system shown in FIG. 1.

FIG. 4 is a block diagram showing function realizing unit of the CPU 201 centering on the output setting of the background sounds, the recording medium 122, the RAM 123, the television monitor 143, the loudspeakers 164 and the controller 183 (start-button 183a, A-button 183b, C1-button 183h and C2-button 183i). The interface circuits, buses, etc. are not shown in FIG. 4 in order to simplify the description.

Specifically, the CPU 201 is provided with the respective function realizing unit as a button operation discriminating unit 201a, a game selection instructing unit 201b, a game data reading unit 201c, a character display control unit 201d, a viewing point/viewing direction data reading unit 201e and a background sound control unit 201f. The background sound control unit 201f is provided with the respective function realizing unit as a background sound discriminating unit 201g, a background sound output unit 201h and a setting completion discriminating unit 201i. The background sound output unit 201h is provided with the respective function realizing unit as an output ratio calculating unit 201j and a volume setting unit 201k.

The button operation discriminating unit 201a discriminates whether the start button 183a, A-button 183b, the C1-button 183h and C2-button 183i have been turned on or off in accordance with operation signals from these buttons. One game is selected from a plurality of games when the start button 183a is turned on. The start of the game is enabled when the A-button 183b is operated. When the C1-button 183h and the C2-button 183i are alternately successively operated, the running speed of the play character MA is increased and the jumped distance is increased in the case of the long jump game according to the operated amounts of the buttons 183h, 183i.

The game selection instructing unit 201b gives, to the game data reading unit 201c, an instruction to read the program of the selected game from the recording medium 122 when one game is selected from a plurality of games by operating the start button 183a. The game data reading unit 201c reads the game data (game program) from the recording medium 122 based on the reading instruction from the game selection instructing unit 201b, stores the read game data in the RAM 123, and reads the game data from the RAM 123 as the game proceeds. The game selection instructing unit 201b constructs the game selecting unit together with the start button 183a and the button operation discriminating unit 201a.

The character display control unit 201d controls the display of the game screens including the play characters MA and background images as the selected game proceeds, and is adapted to output the image data read from the RAM 123 by the data reading unit 201c to the image display unit 14 and to display the game screens on the television monitor 143.

The viewing point/viewing direction data reading unit 201e reads the viewing point data and the viewing direction data of the virtual camera from the RAM 123 in a cycle of, e.g. 1/60 sec. These viewing point data and viewing direction data are stored in the RAM 123 after being transferred from the recording medium 122 for the game screens displayed based on the game program set beforehand while being stored in the RAM 123 after being calculated based on the operated amount of the controller 183 for the game screens display-controlled according to the operation of the controller 183 by the game player.

The background sound control unit 201f controls the output of a game music, sound effects, a plurality of background sounds including "cheers", "noises", "applause", "vigorous sounds" having different attributes as the game proceeds. The background sound control unit 201f successively reads the sound data read from the recording medium 122 from the RAM 123, outputs them to the sound output unit 16, and outputs them as background sounds via the two loudspeakers 164. The background sound control unit 201f individually sets and changes an output ratio (amplitude of the sound) of the background sound between the two loudspeakers according to the attribute of the background sound based on the viewing point data and the viewing direction data read from the RAM 123 by the viewing point/viewing direction data reading unit 201e, and outputs the background sound in volumes corresponding to the set output ratio via the two loudspeakers 164.

Figure 5:
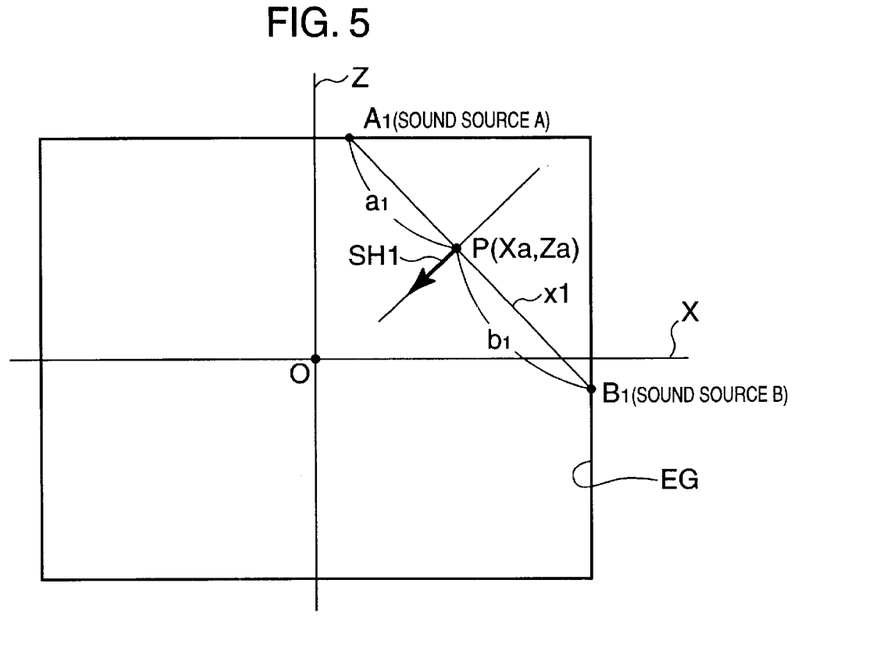

The output ratio of the background sound is set, for example, as follows. Specifically, as shown in FIG. 5, an event place EG viewed from right above is represented by a rectangular frame (this frame may be square or circular) on X-Z coordinate systems, and the presence of the virtual camera in the event place EG is assumed. It is further assumed that the virtual camera is located at a position represented by (Xa, Za) which is a viewing point P, and the viewing direction (facing direction) of the virtual camera is a direction indicated by an arrow SH1.

In this state, a line x1 passing the viewing point (Xa, Za) and normal to the viewing direction is drawn. A1, B1 denote intersections of the line x1 with the frame representing the event place EG at the right and left sides with respect to the viewing direction, respectively. A sound source A including a plurality of background sounds having different attributes and a sound source B identical to the sound source A are assumed to be located at the intersections A1, B1, respectively.

A distance a1 between the viewing point P and the intersection A1 and a distance b1 between the viewing point P and the intersection B1 are calculated, and an output ratio is set based on these distances a1, b1. Specifically, since the distance a1 is shorter than the distance b1 in the case shown in FIG. 5, the output ratio between the left and right loudspeakers 164 is so set as to increase the volume of the sound source A from the right loudspeaker 164 and to reduce the volume of the sound source B from the left loudspeaker 164. Since the respective coordinates of the event place EG in the X-Z coordinate systems are set beforehand, the respective intersections A1, B1 can be obtained by calculating an equation expressing the line x1 on the X-Z coordinate systems based on the coordinates of the viewing point P and the viewing direction.

Figure 6:
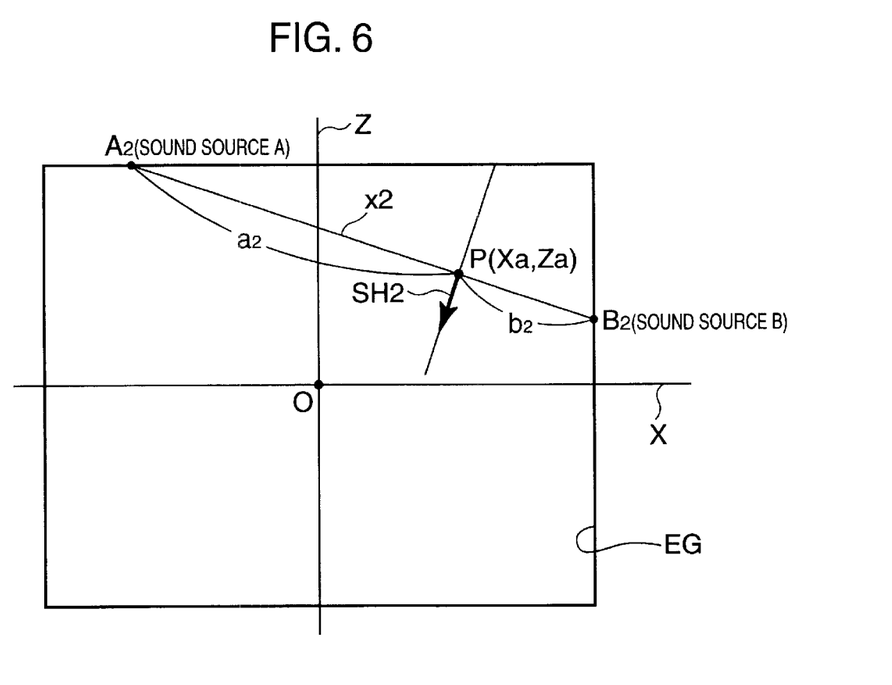

Further, if the viewing direction is changed to a direction indicated by an arrow SH2 with the position of the viewing point P left unchanged from that of FIG. 5 as shown in FIG. 6 (i.e. the virtual camera is faced in the direction of the arrow SH2), the output ratio between the left and right loudspeakers 164 is changed as follows. Specifically, a line x2 passing the viewing point (Xa, Za) and normal to the viewing direction is drawn as above. A2, B2 denote intersections of the line x2 with the frame representing the event place EG at the right and left sides with respect to the viewing direction, respectively. The sound source A is located at the intersection A2 while the sound source B is located at the intersection B2.

In this state, a distance a2 between the viewing point P and the intersection A2 and a distance b2 between the viewing point P and the intersection B2 are calculated, and an output ratio is set based on these distances a2, b2. Since the distance a2 is longer than the distance b2 in the case shown in FIG. 6, the output ratio between the left and right loudspeakers 164 is so set as to reduce the volume of the sound source A from the right loudspeaker 164 and to increase the volume of the sound source B from the left loudspeaker 164.

Figure 7:
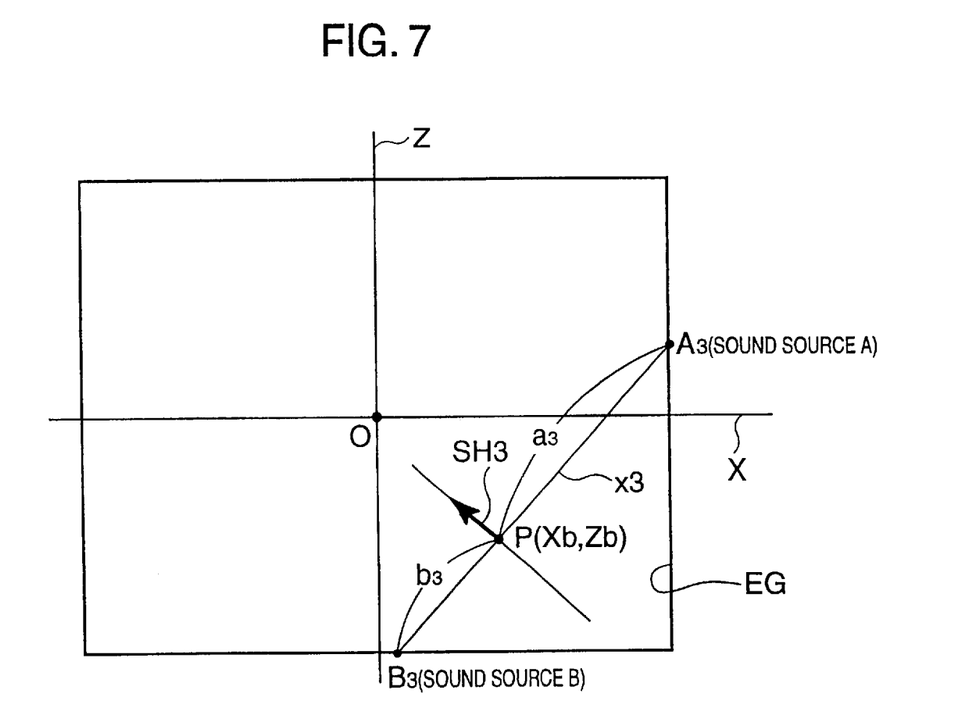

Further, if the viewing point P is moved to a position represented by (Xb, Zb) and the viewing direction is a direction indicated by an arrow SH3 (i.e. the virtual camera is moved to the position (Xb, Zb) and is faced in the direction of the arrow SH3), the output ratio between the left and right loudspeakers 164 is changed as follows. Specifically, a line x3 passing the viewing point (Xb, Zb) and normal to the viewing direction is drawn as above. A3, B3 denote intersections of the line x3 with the frame representing the event place EG at the right and left sides with respect to the viewing direction, respectively. The sound source A is located at the intersection A3 while the sound source B is located at the intersection B3.

In this state, a distance a3 between the viewing point P and the intersection A3 and a distance b3 between the viewing point P and the intersection B3 are calculated, and an output ratio is set based on these distances a3, b3. Since the distance a3 is longer than the distance b3 in the case shown in FIG. 7, the output ratio between the left and right loudspeakers 164 is so set as to reduce the volume of the sound source A from the right loudspeaker 164 and to increase the volume of the sound source B from the left loudspeaker 164.

Specifically, in this embodiment, the output ratio between the left and right loudspeakers 164 is changed, assuming that the spectators' seats are set at the entire periphery of the event place EG and the same sound sources including a plurality of background sounds having different attributes are located at the respective positions around the event place EG. In fact, the background sounds become louder as the viewing point P moves closer to the two sound sources while becoming quieter as the viewing point moves away from the two sound sources. However, the volume is not adjusted according to the distances between the viewing point P and the two sound sources in order to prevent data processing from becoming complicated.

The output ratio between the left and right loudspeakers 164 is individually set and changed according to the attribute of the background sound. Specifically, in this embodiment, a plurality of background sounds including "cheers", "noises", "applause", "vigorous sounds" and the like having different attributes are prepared as described above, and these background sounds are suitably combined and simultaneously outputted from the left and right loudspeakers 164. The "cheers" are sound components of joyful shouts let out, for example, when the competition is started and when a new record is established, and the "noises" are sound components representing a noisy state at the event place. Further, the "applause" is sound components of hand-clapping given, for example, when the play characters MA enter the event place and when the competition is started, and the "vigorous sounds" are sound components representing whistling, hooting and jeering, shouts, etc.

The background sound data for outputting the background sounds having different attributes are respectively comprised of individual channels, and can be specified by channel numbers (or label numbers) given to the respective channels. The output ratio between the left and right loudspeakers 164 is not largely changed (i.e. the amplitude is decreased to reduce a variation of the output ratio) for the "noises" which are low-frequency sound components and the "applause" which is high-frequency sound components, whereas it is largely changed (i.e. the amplitude is increased to increase a variation of the output ratio) for the "cheers" and the "vigorous sounds" which are intermediate-frequency sound components.

It is an empirically obtained result to individually change the output ratio according to the attribute of the background sound. If the "noises" and the "applause" are changed at the same output ratio as the "cheers" and the "vigorous sounds", the "noises" and the "applause" stand out from the "cheers" and the "vigorous sounds", resulting in a very unnatural state. The output ratios of the respective sound components are adjusted beforehand such that the background sounds do not sound unnatural to the game player.

The output ratio between the left and right loudspeakers 164 when the viewing point and the viewing direction are changed is, for example, calculated as follows. Specifically, an output ratio between the left and right loudspeakers 164 which serves as a reference value according to the attribute of each background sound when the viewing point P is located at a preset reference position (e.g. origin O of the X-Z coordinate systems in FIGS. 5 to 7) is set. Such a value as not to make the background sound sound unnatural is selected for this output ratio by repeating experiments. Then, a ratio of a distance between the viewing point P and the right sound source A to a distance between the two sound sources A, B, and a ratio of a distance between the viewing point P and the left sound source B to the distance between the two sound sources A, B are calculated. The calculated ratios are multiplied by a correction coefficient set in advance for each of the background sounds having different attributes (the output ratios of the sound components "noises", "applause" are set at such values as not to largely change with respect to the reference values as compared to the sound components "cheers", "vigorous sounds"), and the output ratio is calculated using the obtained multiples and the reference value.

It will be further realized that the output ratio of the background sounds may be calculated in accordance with a ratio between a first distance and a second distance where the first distance is a space between the viewing point P and the first sound source A and the second distance is a space between the viewing point P and the second sound source B.

The background sound discriminating unit 201g discriminates the attribute of the background sound outputted from the two loudspeakers 164. Specifically, in this embodiment, the "cheers", "noises", "applause", "vigorous sounds" and the like are prepared as background sounds as described above, and the attribute of the background sound is discriminated by reading the channel number (or label number) given to the data of the background sound outputted in relation to each game screen.

The background sound output unit 201h sets the output ratio between the loudspeakers 164 for the background sound outputted from the two loudspeakers 164 according to the attribute of the background sound discriminated by the background sound discriminating unit 201g and sets the volume of the background sound outputted from the two loudspeakers 164 based on the set output ratio.

The setting completion discriminating unit 201i discriminates whether setting of the output ratio and volume of the background sound in the two loudspeakers 164 according to the changes of the viewing point and viewing direction of the virtual camera has been completed.

The output ratio calculating unit 201j individually calculates the output ratio between the two loudspeakers 164 for the background sound according to the attribute of the background sound discriminated by the background sound discriminating unit 201g. For example, as described with reference to FIGS. 5 to 7, the output ratio is set at the reference value when the viewing point P is located at the reference position, whereas the ratio of the distance between the viewing point P and the right sound source A to the distance between the two sound sources A, B, and the ratio of the distance between the viewing point P and the left sound source B to the distance between the two sound sources A, B are calculated, the calculated ratios are multiplied by the correction coefficient set in advance for each of the background sounds, and the output ratio is calculated using the obtained multiples and the reference value when the viewing position P is located at a position other than the reference position.

The volume setting unit 201k sets the volume of the background sound outputted from the two loudspeakers 164 based on the output ratio calculated by the output ratio calculating unit 201j. Specifically, the background sound data used to output the respective background sounds include volume data corresponding to the two loudspeakers 164, and the volume of each background sound is individually set based on the volume data and the output ratio. Each background sound is outputted in the newly set volume from the two loudspeakers 164.

Figure 8:
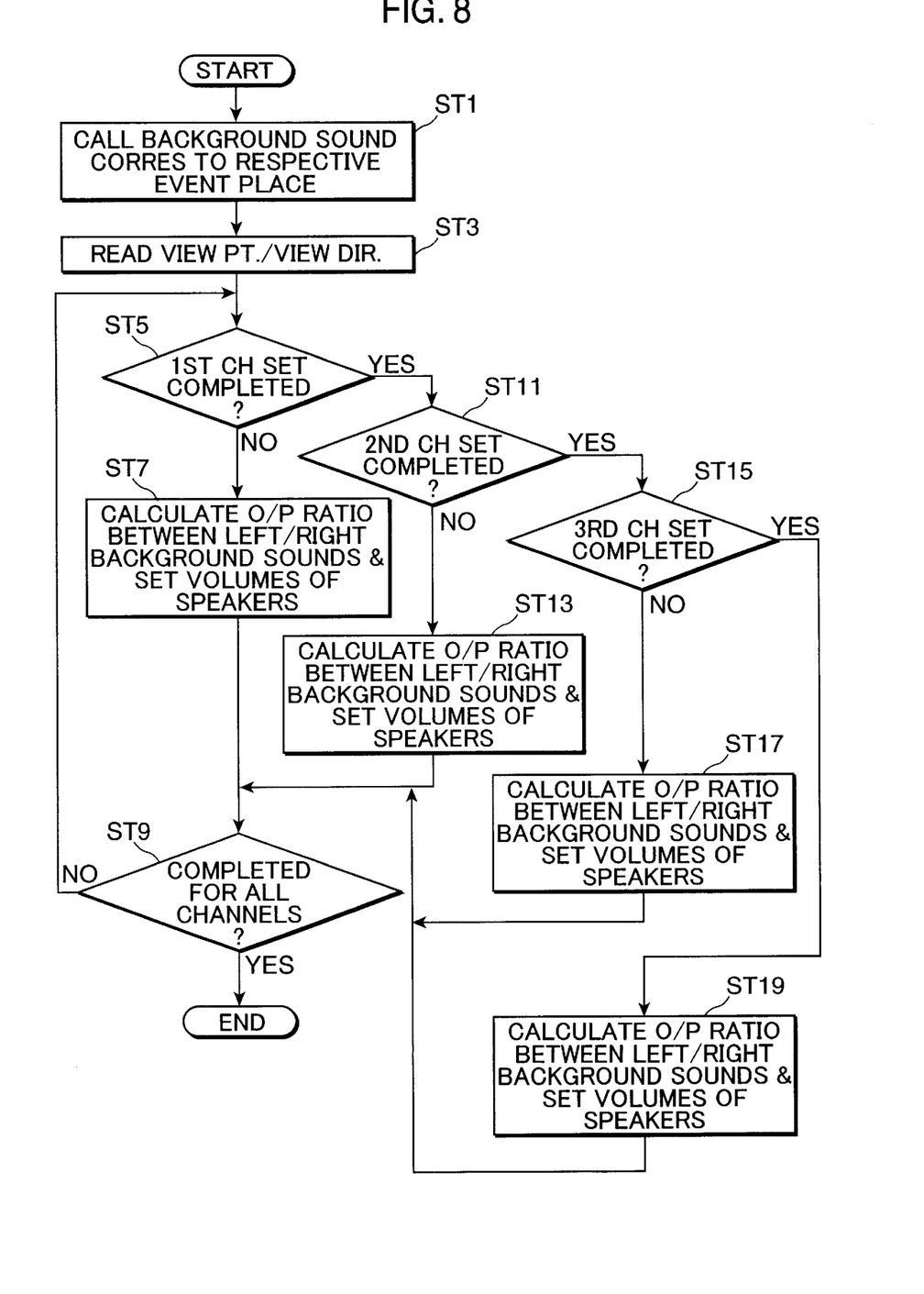
FIG. 8 is a flow chart showing an operation of setting the output ratio of the background sound in the video game system shown in FIG. 1.

Next, an operation of setting the output of the background sound in the video game system 10 is described with reference to a flow chart shown in FIG. 8. Here, it is assumed that four kinds of background sounds (first to fourth channels) are outputted. First, the game is started by turning the A-button 183b on after the start button 183a is turned on, and the image data are read from the RAM 123 by the game data reading unit 201c and a specified game screen is displayed on the television monitor 143 by the character display control unit 201d.

Simultaneously, the background sound data prepared for the respective even places by the background sound control unit 201f is called by the background sound control unit 201f (Step ST1). The background sound data of the first to fourth channels for outputting the background sounds corresponding to the event places such as a track and field stadium where a specified competition or the like is held are read from the RAM 123 by the game data reading unit 201c and outputted as background sounds at a specified output ratio from the left and right loudspeakers 164.

Subsequently, the viewing point and viewing direction of the virtual camera which change as the game progresses are read from the RAM 123 by the viewing point/viewing direction data reading unit 201e (Step ST3). Then, the setting completion discriminating unit 201k discriminates whether new output ratio and volume have been set for the background sound of the first channel discriminated by the background sound discriminating unit 201g (Step ST5). If this discrimination result is negative, the output ratio between the left and right loudspeakers 164 corresponding to the viewing point and viewing direction for this background sound is set by the output ratio calculating unit 201j, and the volume of the background sound to be outputted from the left and right speakers 164 based on the calculated output ratio is set by the volume setting unit 201k (Step ST7).

Subsequently, the setting completion discriminating unit 201k discriminates whether setting has been completed for the background sounds of all channels (Step ST9). If this discrimination result is negative, the setting completion discriminating unit 201k discriminates whether new output ratio and volume have been set for the background sound of the second channel (Step ST11) after returning to Step ST5. If this discrimination result is negative, the output ratio between the left and right loudspeakers 164 corresponding to the viewing point and viewing direction for this background sound is calculated by the output ratio calculating unit 201j, and the volume of the background sound to be outputted form the left and right loudspeakers 164 based on the calculated output ratio is set by the volume setting unit 201k (Step ST13).

Subsequently, the setting completion discriminating unit 201k discriminates whether new output ratio and volume have been set for the background sound of the third channel (Step ST15) after returning to Step ST9. If this discrimination result is negative, the output ratio between the left and right loudspeakers 164 corresponding to the viewing point and viewing direction for this background sound is calculated by the output ratio calculating unit 201j, and the volume of the background to be outputted form the left and right speakers 164 based on the calculated output ratio is set by the volume setting unit 201k (Step ST17).

If the discrimination result in Step ST15 is affirmative, the output ratio between the left and right loudspeakers 164 corresponding to the viewing point and viewing direction for the background sound of the fourth channel is calculated by the output ratio calculating unit 201j, and the volume of the background sound to be outputted form the left and right speakers 164 based on the calculated output ratio is set by the volume setting unit 201k (Step ST19). This routine then returns to Step ST9, and output setting for all background sounds is completed when the discrimination result in Step ST9 is affirmative.

As described above, in this embodiment, while a plurality of background sound data having different attributes are read from the recording medium 122 or the RAM 123 to be outputted as background sounds from the two loudspeakers 164, the output ratio of the background sound between the two loudspeakers 164 is set for each of the background sounds having different attributes according to the viewing point and the viewing direction in the game space. Accordingly, the output of the background sound having a specific attribute in a more emphasized manner than the background sounds having other attributes can be effectively prevented. Thus, a video game full of feeling of presence can be executed even if the viewing position and the viewing direction are changed.

The present invention is not limited to the foregoing embodiment, and may take various embodiments as below.

(1) In the foregoing embodiment, the output ratio between the left and right loudspeakers 164 is calculated assuming that the sound sources are present at the opposite sides with respect to the viewing direction as shown in FIGS. 5 to 7. However, the positions of the sound sources are not limited to the above. For example, the two loudspeakers 164 may be vertically spaced apart, and the output ratio and the volumes of the two loudspeakers 164 may be calculated assuming that the sound sources are located in Y-axis direction (vertical direction) of XYZ-coordinate systems.

(2) Although the background sounds are outputted from the two loudspeakers 164 in the foregoing embodiment, three or more loudspeakers 164 may be installed around the television monitor 143 and the background sounds may be outputted from these three or more loudspeakers 164. In such a case, the background sounds having different attributes may be outputted from the respective loudspeakers 164.

(3) In the foregoing embodiment, the output ratio between the left and right loudspeakers 164 is calculated assuming that the sound sources including the same background sounds are located at the left and right sides of the viewing direction as shown in FIGS. 5 to 7. However, the output ratio and the volume may be calculated assuming that sound sources including different background sounds are located at the left and right sides.

(4) In the foregoing embodiment, the volume is not adjusted according to the distances between the viewing point and the two sound sources despite the fact that the background sounds become louder as the viewing point P moves closer to the two sound sources while becoming quieter as the viewing point moves away from the two sound sources. However, such a volume adjustment may be made.

(5) Although the long jump game is described as a video game in the foregoing embodiment, the present invention is applicable not only to competition games including various fighting games, running games and gymnastic games, but also to video games other than competition games such as growth games and music games.

As described above, the present invention is designed to set the output ratio of the background sound between the output unit according to the viewing point and the viewing direction in the game space for each of the background sounds having different attributes while reading a plurality of background sound data having different attributes and outputting them as background sounds from a plurality of sound output units. Thus, the output of the background sound having a specific attribute in a more emphasized manner than the background sounds having other attributes can be effectively prevented. Therefore, a video game full of feeling of presence can be executed even if the viewing position and the viewing direction are changed.

According to the present invention, the output ratio of the background sound to be output from the sound output units may be calculated according to the attribute, and the volume of the background sound to be outputted from the respective sound output units at the calculated output ratio may be set. This enables the volumes of the respective sound means to be set according to the attributes of the background sounds, with the result that a video game full of better feeling of presence can be executed even if the viewing position and the viewing direction are changed.

Further according to the present invention, if the sound output units are located at the left and right sides of the monitor, the output ratio of the background sound may be calculated assuming that the sound sources of the background sounds are located at the left and right sides with respect to the viewing direction in the game space. This simplifies calculation of the output ratios and reduces a burden on the CPU, enabling a high-speed data processing. As a result, a video game full of feeling of presence can be executed.

Further according to the present invention, the attributes of the background sounds may be characterized by their frequencies, and the output ratios of the background sounds including high-frequency sound components and low-frequency sound components may vary to a smaller degree than those of the background sounds including intermediate-frequency sound components. Thus, the output of the background sound having a specific attribute in a more emphasized manner than the background sounds having other attributes can be effectively prevented. Therefore, a video game full of feeling of presence can be executed even if the viewing position and the viewing direction are changed.

This application is based on Japanese application serial no. 2000-069272, filed in Japan on Mar. 13, 2000, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A video game apparatus in which a specified event is executed in a game space displayed on a monitor, and a plurality of background sounds having different attributes are outputted at a specified output ratio from a plurality of sound output units spaced apart from each other, comprising:

a recording unit for storing the plurality of background sounds as background sound data, and a background sound control unit for setting the output ratio of levels the background sounds output from at least two of the sound output units based on a relationship of a viewing point and a viewing direction to at least two virtual sound sources, each producing same ones of the background sounds, in the game space while reading the background sound data from the recording unit and outputting the background sounds from the plurality of sound output units, wherein the output ratio of the background sounds is calculated in accordance with a ratio between a first distance and a second distance where said first distance is a space between the viewing point and a first one of the virtual sound sources and a second distance is a space between the viewing point and a second one of the virtual sound sources.

2. A video game apparatus according to claim 1, wherein the background sound control unit includes a background sound output unit for further setting the output ratio of the background sounds to be output from the sound output units according to a corresponding one of the attributes.

3. A video game apparatus according to claim 2, wherein the background sound output unit includes an output ratio calculating unit for calculating the output ratio of the background sounds to be output from the sound output units according to the attribute, and a volume setting unit for setting a volume of the background sounds to be outputted from respective ones of the sound output units at the output ratio calculated by the output ratio calculating unit.

4. A video game apparatus according to claim 1, wherein the output ratio of the background sounds is calculated using a correction coefficient which is set in advance for each of the background sounds in addition to said ratio between the first distance and the second distance.

5. A video game apparatus according to claim 1, wherein the output ratio of the background sounds is calculated based on said first distance and said second distance in addition to said ratio between the first distance and the second distance.

6. A background sound output setting method in a video game in which a specified event is executed in a game space displayed on a monitor, and a plurality of background sounds having different attributes are outputted at a specified output ratio from a plurality of sound output units spaced apart from each other, comprising the steps of:

reading the background sound data from a recording unit for storing the plurality of background sounds having different attributes, outputting the read background sound data as background sounds from the plurality of sound output units, and setting the output ratio of levels the background sounds output from at least two of the sound output units based on a relationship of a viewing point and a viewing direction to at least two virtual sound sources, each producing same ones of the background sounds, in the game space, wherein the output ratio of the background sounds is calculated in accordance with a ratio between a first distance and a second distance where said first distance is a space between the viewing point and a first one of the virtual sound sources and a second distance is a space between the viewing point and a second one of the virtual sound sources.

7. A background sound output setting method according to claim 6, wherein the output ratio of the background sounds to be output from the sound output units is also calculated according to a corresponding one of the attributes, and a volume of the background sound to be output from the respective sound output units is set at the output ratio.

8. A background sound output setting method according to claim 6, wherein the attributes of the background sounds are characterized by frequencies thereof, and the output ratios of ones of the background sounds including one of high-frequency sound components and low-frequency sound components vary less than other ones of the background sounds including intermediate-frequency sound components.

9. A computer readable recording medium storing a background sound output setting program in a video game in which a specified event is executed in a game space displayed on a monitor, and a plurality of background sounds having different attributes are outputted at a specified output ratio from a plurality of sound output units spaced apart from each other, wherein the output ratio of the background sounds output from at least two of the sound output units is set based on a relationship a viewing point and a viewing direction to at least two virtual sound sources, each producing same ones of the background sounds, in the game space while background sound data of the background sounds is read from a recording unit and output from the plurality of sound output units, wherein the output ratio of the background sounds is calculated in accordance with a ratio between a first distance and a second distance where said first distance is a space between the viewing point and a first one of the virtual sound sources and a second distance is a space between the viewing point and a second one of the virtual sound sources.

10. A computer readable recording medium according to claim 9, wherein the output ratio of the background sounds to be output from the sound output units is also calculated according to a corresponding one of the attributes, and a volume of the background sound to be output from the respective sound output units is set at the output ratio.

11. A computer readable recording medium according to claim 9, wherein the output ratios are also calculated based on an assumption that the virtual sound sources of the background sounds are located at the left and right sides with respect to the viewing direction in the game space when the sound output units are located at the left and right sides of the monitor.

12. A computer readable recording medium according to claim 9, wherein the attributes of the background sounds are characterized by frequencies thereof, and the output ratios of ones of the background sounds including one of high-frequency sound components and low-frequency sound components vary less than other ones of the background sounds including intermediate-frequency sound components.

13. A video game apparatus for playing a game in a virtual game space displayed on a monitor, comprising:

a memory storing image data, a game program, and sound data including at least a first background sound data for producing a first background sound;

a control means for displaying on said monitor at least a portion of said virtual game space based on a viewpoint position and viewpoint direction calculated based on said game program data, said virtual game space having a perimeter boundary;

at least first and second sound output units that are spaced apart from each other;

a background sound control unit for driving said first and second sound output units via first and second channels to output said first background sound from each of said first and second sound output units at respective first and second output levels, said first and second output levels being determined at least in part based on an output ratio determined by a spacial relationship of said viewpoint position, said viewpoint direction and first and second virtual sound sources in said virtual game space;

said background sound control unit setting positions of said first and second virtual sound sources on said perimeter boundary;

an event arena in the virtual game space defining said perimeter boundary, said perimeter boundary being a rectangle; and said first and second virtual sound sources being located at intersections of a line with said perimeter boundary, said line passing through said viewpoint position and normal to said viewpoint direction.

14. The game apparatus according to claim 13 wherein the background sound control unit sets the output ratio based on a ratio of a first distance between said viewpoint position and said first virtual sound source to a second distance between said viewpoint position and said second virtual sound source.

15. The game apparatus according to claim 13 wherein the background sound control unit sets the first and second output levels based on:

a first ratio of a first distance between said viewpoint position and said first virtual sound source to a separation distance between said first and second virtual sound sources; and a second ratio of a second distance between said viewpoint position and said second virtual sound source said separation distance between said first and second virtual sound sources.

16. The game apparatus according to claim 13 wherein the background sound control unit sets the output ratio based on a ratio of a first distance between said viewpoint position and said first virtual sound source to a second distance between said viewpoint position and said second virtual sound source.

* * * * *